(12) United States Patent
Sanghvi et al.

(10) Patent No.: US 11,190,643 B1
(45) Date of Patent: Nov. 30, 2021

(54) AUTOMATED REDISTRIBUTION OF QUERIES TO UNDERUTILIZED CHANNELS

(71) Applicant: Bank of America Corporation, Charlotte, NC (US)

(72) Inventors: Siten Sanghvi, Westfield, NJ (US); Naga Vamsi Krishna Akkapeddi, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 16/942,954

(22) Filed: Jul. 30, 2020

(51) Int. Cl.
| | |
|---|---|
| *H04M 3/523* | (2006.01) |
| *G06Q 30/00* | (2012.01) |
| *G06N 5/04* | (2006.01) |
| *G06Q 10/06* | (2012.01) |
| *G06N 3/08* | (2006.01) |

(52) U.S. Cl.
CPC ............ *H04M 3/5237* (2013.01); *G06N 3/08* (2013.01); *G06N 5/043* (2013.01); *G06Q 10/0631* (2013.01); *G06Q 10/06312* (2013.01); *G06Q 30/016* (2013.01); *H04M 3/5238* (2013.01)

(58) Field of Classification Search
None
See application file for complete search history.

(56) References Cited

U.S. PATENT DOCUMENTS

| | | | |
|---|---|---|---|
| 7,110,525 B1 | 9/2006 | Heller et al. | |
| 7,149,303 B1 | 12/2006 | Laurinavichus | |
| 7,606,714 B2 | 10/2009 | Williams et al. | |
| 8,204,182 B2 | 6/2012 | Da Palma et al. | |
| 8,346,942 B2 | 1/2013 | Ezerzer et al. | |
| 8,532,630 B2 | 9/2013 | Mottes | |
| 9,912,810 B2 | 3/2018 | Segre et al. | |
| 10,187,337 B2 | 1/2019 | Smullen et al. | |
| 2003/0231647 A1* | 12/2003 | Petrovykh | H04L 65/1069 370/429 |
| 2013/0198039 A1* | 8/2013 | Sridharan | G06Q 30/0613 705/26.44 |
| 2015/0178371 A1 | 6/2015 | Seth et al. | |
| 2016/0080570 A1* | 3/2016 | O'Connor | H04M 3/5133 379/265.09 |
| 2017/0111509 A1* | 4/2017 | McGann | H04M 3/5232 |
| 2017/0201624 A1* | 7/2017 | Runyan | H04M 3/4935 |
| 2020/0120185 A1* | 4/2020 | Salter | G06F 40/35 |
| 2020/0334615 A1* | 10/2020 | Benjamin | G06Q 10/04 |

* cited by examiner

*Primary Examiner* — Antim G Shah
(74) *Attorney, Agent, or Firm* — Banner & Witcott, Ltd.; Michael A. Springs

(57) ABSTRACT

Aspects of the disclosure relate to automated redistribution of queries to underutilized channels. A computing platform may monitor user traffic for one or more customer service communication channels. Subsequently, the computing platform may identify estimated wait times for a plurality of users to be served via the one or more channels. Then, the computing platform may initiate, via an intelligent virtual assistant, a communication with a given user of the plurality of users. Then, the computing platform may receive, via the intelligent virtual assistant, one or more attributes of a query of the given user. Then, the computing platform may select a channel of the one or more channels. Then, the computing platform may provide, to an enterprise agent associated with the selected channel, the one or more attributes of the query. Subsequently, the computing platform may direct the given user to the selected channel.

16 Claims, 5 Drawing Sheets

US 11,190,643 B1

AUTOMATED REDISTRIBUTION OF QUERIES TO UNDERUTILIZED CHANNELS

BACKGROUND

Aspects of the disclosure relate to deploying machine learning systems to predict wait times for customer queries and allocate customers to communication channels. In particular, one or more aspects of the disclosure relate to automated redistribution of queries to underutilized channels.

Enterprise organizations may utilize various computing infrastructure to provide services to their customers. Customers of the enterprise organization may have queries and may contact customer service agents at the enterprise organization. Several communication channels may be utilized by the enterprise organization to provide such customer service. Such communication channels may have different wait times based on a volume of customer traffic. Some customers may have preferences for certain types of communication channels. Also, for example, different customer queries may require different levels of service. Detecting a pattern of customer activity for customers over such communication channels, and redirecting customers to appropriate communication channels, may be of high significance to an enterprise organization. In many instances, however, it may be challenging to detect the appropriate underutilized communication channels, while also attempting to optimize the resource utilization, bandwidth utilization, and efficient operations of the computing infrastructure involved in maintaining, accessing, and executing such customer service options.

SUMMARY

Aspects of the disclosure provide effective, efficient, scalable, fast, reliable, and convenient technical solutions that address and overcome the technical problems associated with automated redistribution of queries to underutilized channels.

In accordance with one or more embodiments, a computing platform having at least one processor, and memory, may monitor, via a computing device, user traffic for one or more customer service communication channels. Subsequently, the computing platform may identify, for the one or more customer service communication channels and based on the user traffic, estimated wait times for a plurality of users to be served via the one or more customer service communication channels. Then, the computing platform may initiate, via an intelligent virtual assistant, a communication with a given user of the plurality of users. Then, the computing platform may receive, via the intelligent virtual assistant and based on the communication with the given user, one or more attributes of a query of the given user. Then, the computing platform may select, via the computing device and based on the estimated wait times and the one or more attributes of the query of the given user, a customer service communication channel of the one or more customer service communication channels. Then, the computing platform may provide, via the intelligent virtual assistant and to an enterprise agent associated with the selected customer service communication channel, the one or more attributes of the query of the given user. Subsequently, the computing platform may direct the given user to the selected customer service communication channel.

In some embodiments, the one or more customer service communication channels may include one of: a telephone communication channel, a web interface, a video teleconference interface, an electronic mail communication channel, and the intelligent virtual assistant.

In some embodiments, the computing platform may address the query via the intelligent virtual assistant.

In some embodiments, the computing platform may determine whether a licensed professional is needed to address the query. Then, the computing platform may, upon a determination that a licensed professional is needed to address the query, select the customer service communication channel associated with the licensed professional.

In some embodiments, the computing platform may identify, based on the one or more attributes of the query of the given user and the estimated wait times, a geographic region. Then, the computing platform may select the customer service communication channel associated with the geographic region.

In some embodiments, the computing platform may train a machine learning model to select the customer service communication channel. Subsequently, the computing platform may apply the trained machine learning model to select the customer service communication channel.

In some embodiments, the computing platform may identify, from one or more external data sources, an event that may impact the estimated wait times. Then, the computing platform may determine, based on the identified event, an allocation of resources for the one or more customer service communication channels. In some embodiments, the computing platform may train a machine learning model to determine the allocation of resources for the one or more customer service communication channels.

In some embodiments, the computing platform may determine that the given user has access to a higher generation wireless communication interface. Then, the computing platform may recommend, to the given user and to address the query, a video teleconference interface based on the higher generation wireless communication interface.

In some embodiments, the computing platform may determine, based on location data from a higher generation wireless communication interface, a physical location of the given user. Then, the computing platform may recommend, to the given user and based on the physical location, a physical facility to address the query.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1A:
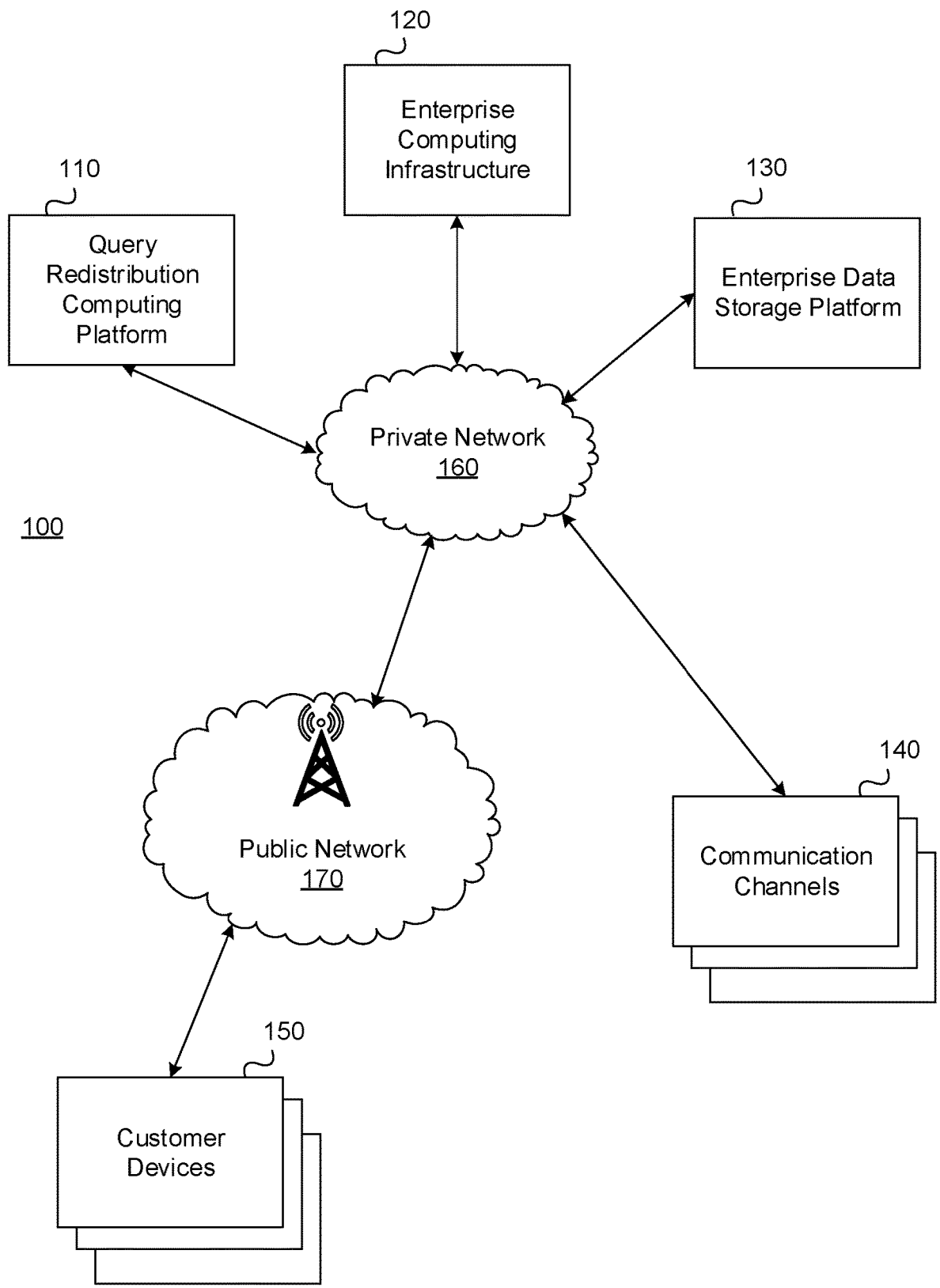
FIGS. 1A and 1B depict an illustrative computing environment for machine learning based automated redistribution of queries to underutilized channels.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Customers of an enterprise organization may contact the enterprise organization to obtain various services. For example, customers of a financial institution may have queries regarding a financial account, a mortgage account, a trading account, and so forth. Generally, an enterprise organization may provide several communication channels to address queries from customers. For example, a customer may place a telephone call to the enterprise organization's customer service center. In many instances, based on a volume of customers that may be calling at a given time, there may be a wait time before the customer's call may be answered by a service agent at the customer service center. In some instances, the enterprise organization may provide more than one communication channel. For example, a web interface may be available to receive customer queries, a text messaging service may be utilized, a virtual assistant may automatically address the customer queries, and so forth. Also, for example, different communication channels may have different wait times, and some communication channels may be less utilized than others. In some instances, a customer may be transferred from one service agent to another to address their specific queries.

For example, a customer may call a customer service center for a retail store to request a refund for an item previously purchased from the retail store. Accordingly, the customer may first communicate with a general service agent who may determine a nature of the customer query. The customer may then be transferred to a second service agent who may specialize in refunds. However, the customer may have to provide details of the customer query to the second agent. In some instances, the second agent may transfer the customer to a manager to resolve certain issues that may be outside a scope of the second agent. Generally, the customer may have to wait to be connected to each of the service agents, and may have to repeat details of the query. In some instances, a customer may be dropped by the communication channel, and may be placed at the end of a queue, thereby causing valuable time to be lost.

In many instances, alternate communication channels may be available for a faster and/or more reliable resolution of a customer query. Generally, customers may not be aware of such alternate communication channels that may decrease wait time, decrease a number of agents and/or optimize available resources that may effectively address the customer query. Accordingly, it may be of high significance for an enterprise organization to devise ways in which to redistribute customer queries to different communication channels so as to decrease average wait times for customers and optimize effective resolution of customer issues. Also, fast and reliable responses to customer queries may impact a customer's well-being, and may therefore be of high significance to the enterprise organization.

Some aspects of the disclosure relate to utilizing machine learning models to detect patterns of customer traffic over various communication channels, identify and/or deploy relevant available resources, and provide timely and effective ways to address the customer queries. Fast information processing, fast data transmission rates, availability of bandwidth, and so forth may be significant factors in automatic redistribution of queries to underutilized channels.

Figure 1B:
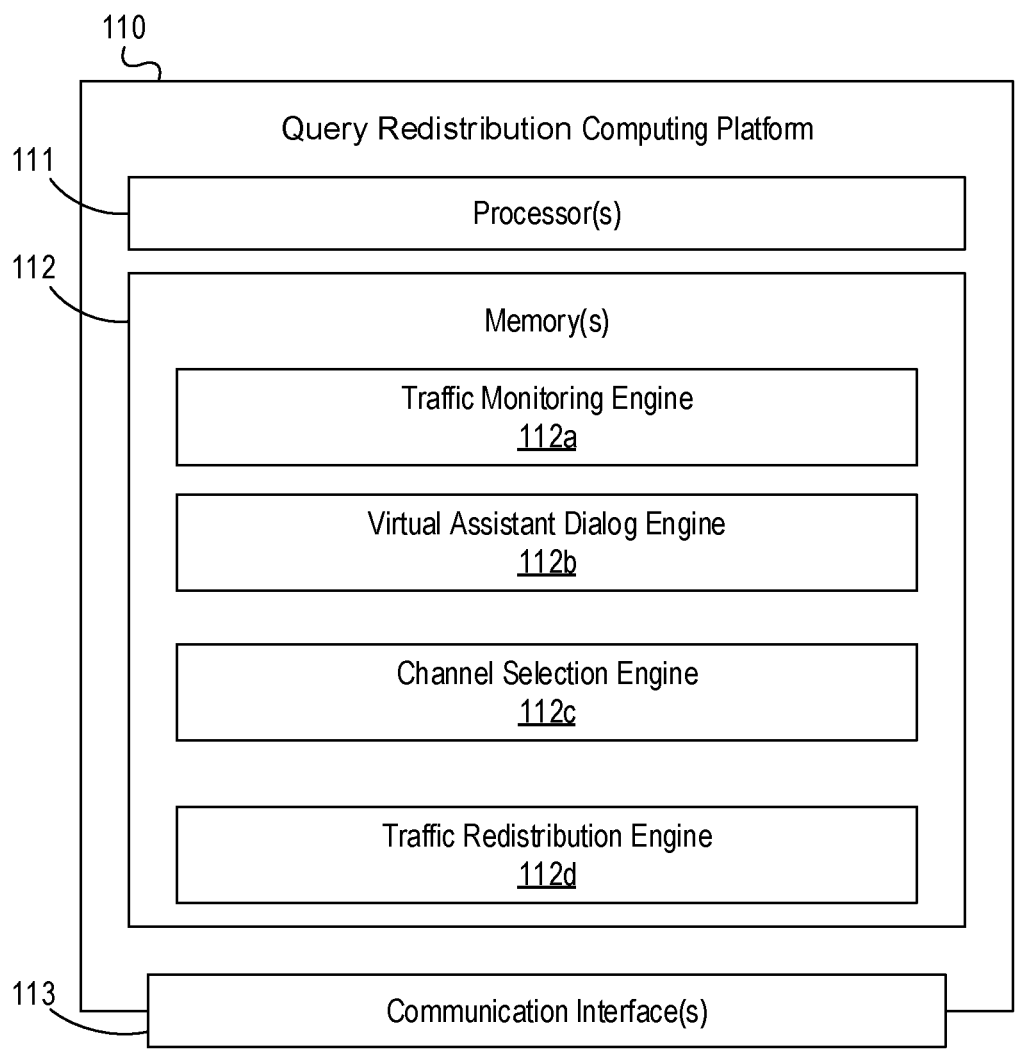

FIGS. 1A and 1B depict an illustrative computing environment for automated redistribution of queries to underutilized channels. Referring to FIG. 1A, computing environment 100 may include one or more computer systems. For example, computing environment 100 may include a query redistribution computing platform 110, enterprise computing infrastructure 120, an enterprise data storage platform 130, communication channels 140, and customer devices 150.

As illustrated in greater detail below, query redistribution computing platform 110 may include one or more computing devices configured to perform one or more of the functions described herein. For example, query redistribution computing platform 110 may include one or more computers (e.g., laptop computers, desktop computers, servers, server blades, or the like) and/or other computer components (e.g., processors, memories, communication interfaces).

Enterprise computing infrastructure 120 may include one or more computing devices and/or other computer components (e.g., processors, memories, communication interfaces). In addition, enterprise computing infrastructure 120 may be configured to host, execute, and/or otherwise provide one or more enterprise applications. For example, enterprise computing infrastructure 120 may be configured to host, execute, and/or otherwise provide one or more transaction processing programs, an enterprise mobile application for customer devices, loan processing programs, and/or other programs associated with an enterprise server. In some instances, enterprise computing infrastructure 120 may be configured to provide various enterprise and/or back-office computing functions for an enterprise organization, such as a financial institution. For example, enterprise computing infrastructure 120 may include various servers and/or databases that store and/or otherwise maintain account information, such as financial account information including account balances, transaction history, account owner information, and/or other information. In addition, enterprise computing infrastructure 120 may process and/or otherwise execute tasks on specific accounts based on commands and/or other information received from other computer systems included in computing environment 100. Additionally or alternatively, enterprise computing infrastructure 120 may receive instructions from query redistribution computing platform 110 and execute the instructions in a timely manner.

Enterprise data storage platform 130 may include one or more computing devices and/or other computer components (e.g., processors, memories, communication interfaces). In addition, and as illustrated in greater detail below, enterprise data storage platform 130 may be configured to store and/or otherwise maintain enterprise data. For example, enterprise data storage platform 130 may be configured to store and/or otherwise maintain, for enterprise customers, account information, payment information, payment schedules, patterns of activity, product and service offerings, discounts, and so forth. Additionally or alternatively, enterprise computing infrastructure 120 may load data from enterprise data storage platform 130, manipulate and/or otherwise process such data, and return modified data and/or other data to enterprise data storage platform 130 and/or to other computer systems included in computing environment 100.

Communication channels 140 may include one or more computers (e.g., laptop computers, desktop computers, servers, server blades, or the like) and/or other computer components (e.g., processors, memories, communication interfaces). Communication channels 140 may generally be a platform to provide customer service. For example, communication channels 140 may be a platform that offers customer service via a telephone. As another example, communication channels 140 may be a platform that offers customer service via a web interface, a text messaging system, a video teleconference system, and so forth. Also, for example, communication channels 140 may be a platform that offers customer service via a virtual assistant or a chatbot. Although not illustrated herein, in some embodiments, communication channels 140 may be a component of query redistribution computing platform 110, or may be a standalone component connected to private network 160. Also, for example, communication channels 140 may represent a plurality of platforms.

Customer devices 150 may be a personal computing device (e.g., desktop computer, laptop computer) or mobile computing device (e.g., smartphone, tablet, wearable device). In addition, customer devices 150 may be linked to and/or used by a specific user (who may, e.g., be a customer of a financial institution or other organization operating query redistribution computing platform 110). Also, for example, user of customer devices 150 may use customer devices 150 to perform transactions (e.g., perform banking operations, perform financial transactions, trade financial assets, and so forth) and communicate with a service center to receive responses to user queries.

Computing environment 100 also may include one or more networks, which may interconnect one or more of query redistribution computing platform 110, enterprise computing infrastructure 120, enterprise data storage platform 130, communication channels 140, and customer devices 150. For example, computing environment 100 may include a private network 160 (which may, e.g., interconnect query redistribution computing platform 110, enterprise computing infrastructure 120, enterprise data storage platform 130, communication channels 140, and/or one or more other systems which may be associated with an organization, such as a financial institution) and public network 170 (which may, e.g., interconnect customer devices 150 with private network 160 and/or one or more other systems, public networks, sub-networks, and/or the like). Public network 170 may be a high generation cellular network, such as, for example, a 5G or higher cellular network. In some embodiments, private network 160 may likewise be a high generation cellular enterprise network, such as, for example, a 5G or higher cellular network.

In one or more arrangements, enterprise computing infrastructure 120, enterprise data storage platform 130, communication channels 140, customer devices 150, and/or the other systems included in computing environment 100 may be any type of computing device capable of receiving input via a user interface, and communicating the received input to one or more other computing devices. For example, enterprise computing infrastructure 120, enterprise data storage platform 130, communication channels 140, and customer devices 150, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of query redistribution computing platform 110, enterprise computing infrastructure 120, enterprise data storage platform 130, communication channels 140, and customer devices 150, may, in some instances, be special-purpose computing devices configured to perform specific functions.

Referring to FIG. 1B, query redistribution computing platform 110 may include one or more processors 111, memory 112, and communication interface 113. A data bus may interconnect processor 111, memory 112, and communication interface 113. Communication interface 113 may be a network interface configured to support communication between query redistribution computing platform 110 and one or more networks (e.g., network 150, network 160, a local network, or the like). Memory 112 may include one or more program modules having instructions that when executed by processor 111 cause query redistribution computing platform 110 to perform one or more functions described herein and/or one or more databases that may store and/or otherwise maintain information which may be used by such program modules and/or processor 111. In some instances, the one or more program modules and/or databases may be stored by and/or maintained in different memory units of query redistribution computing platform 110 and/or by different computing devices that may form and/or otherwise make up query redistribution computing platform 110. For example, memory 112 may have, store, and/or include a traffic monitoring engine 112a, a virtual assistant dialog engine 112b, a channel selection engine 112c, and a traffic redistribution engine 112d.

Traffic monitoring engine 112a may have instructions that direct and/or cause query redistribution computing platform 110 to monitor, via a computing device, user traffic for one or more customer service communication channels, as discussed in greater detail below. In some embodiments, traffic monitoring engine 112a may have instructions that direct and/or cause query redistribution computing platform 110 to identify, for the one or more customer service communication channels and based on the user traffic, estimated wait times for a plurality of users to be served via the one or more customer service communication channels. Virtual assistant dialog engine 112b may have instructions that direct and/or cause query redistribution computing platform 110 to initiate, via an intelligent virtual assistant, a communication with a given user of the plurality of users. In some embodiments, virtual assistant dialog engine 112b may have instructions that direct and/or cause query redistribution computing platform 110 to receive, via the intelligent virtual assistant and based on the communication with the given user, one or more attributes of a query of the given user. Channel selection engine 112c may have instructions that direct and/or cause query redistribution computing platform 110 to select, via the computing device and based on the estimated wait times and the one or more attributes of the query of the given user, a customer service communication channel of the one or more customer service communication channels. In some embodiments, channel selection engine 112c may have instructions that direct and/or cause query redistribution computing platform 110 to provide, via the intelligent virtual assistant and to an enterprise agent associated with the selected customer service communication channel, the one or more attributes of the query of the given user. Traffic redistribution engine 112d may have instructions that direct and/or cause query redistribution computing platform 110 to direct the given user to the selected customer service communication channel.

Figure 2A:
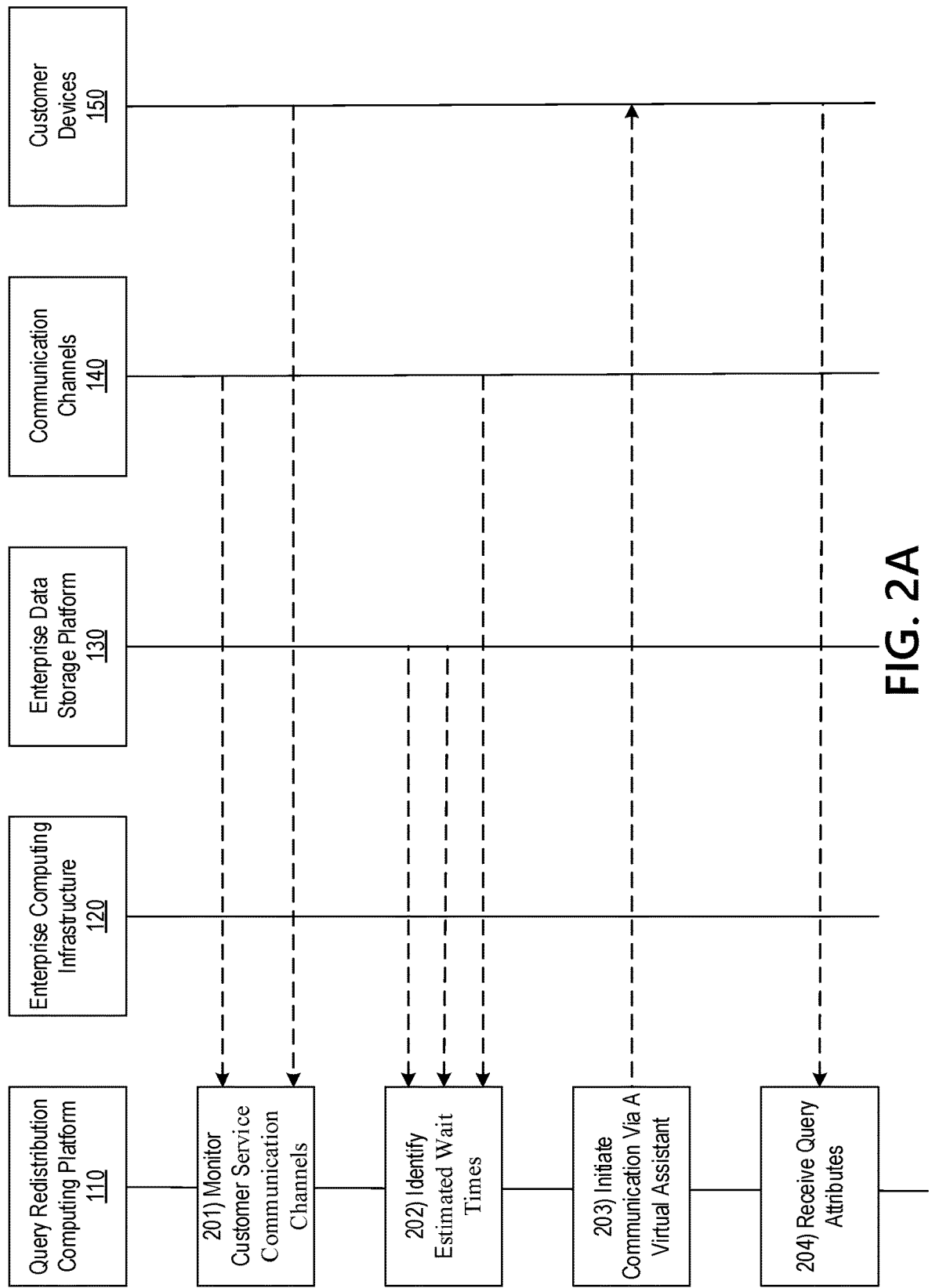
FIGS. 2A and 2B depict an illustrative event sequence for machine learning based automated redistribution of queries to underutilized channels.
Figure 2B:
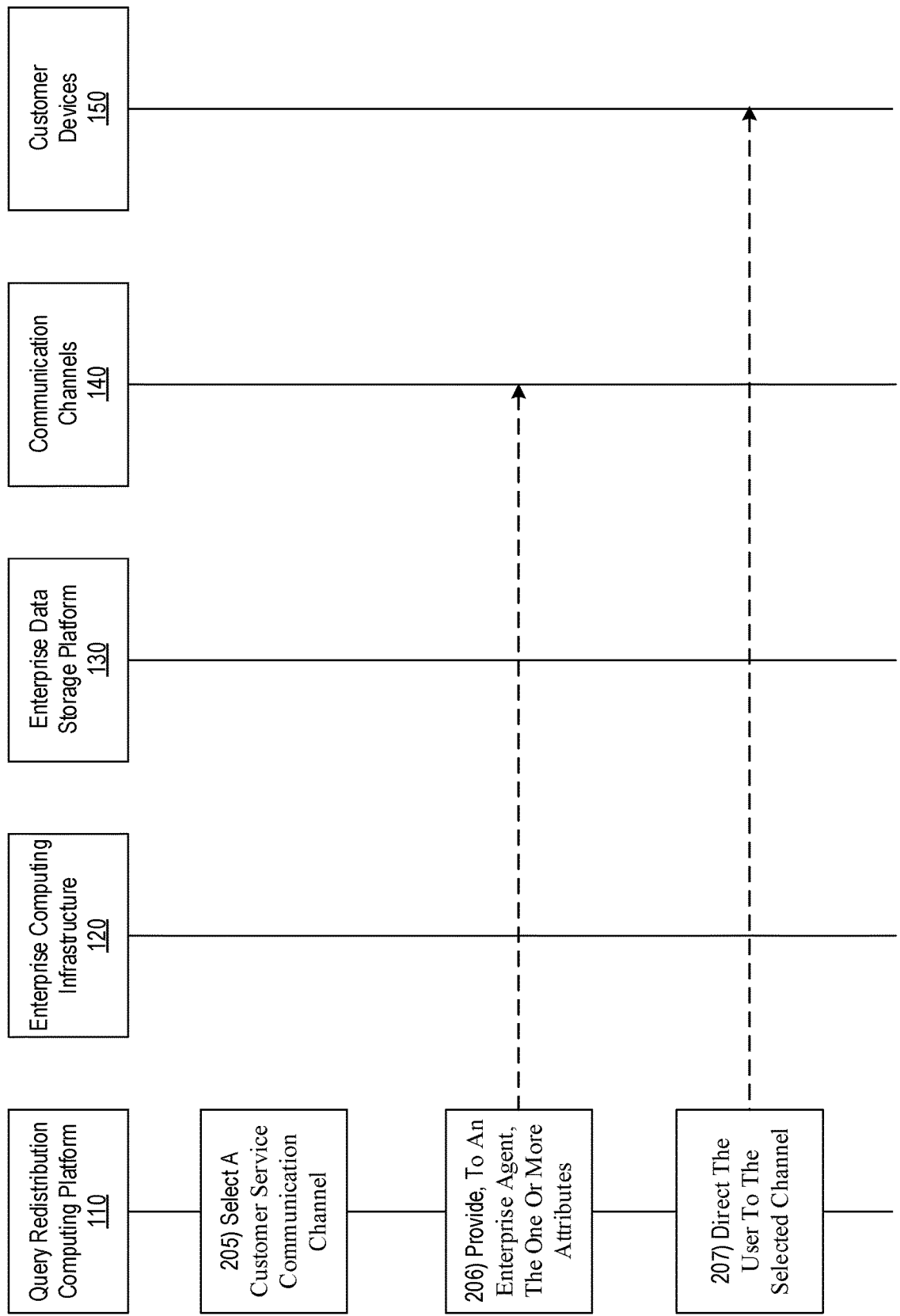

FIGS. 2A and 2B depict an illustrative event sequence for automated redistribution of queries to underutilized channels. Referring to FIG. 2A, at step 201, query redistribution computing platform 110 may monitor, via a computing device, user traffic for one or more customer service communication channels. For example, when a customer using a customer device (e.g., customer devices 150) calls a customer service center, there may be multiple communication channels, such as, for example, a telephone communication channel, a web interface, a video teleconference interface, an electronic mail communication channel, and the intelligent virtual assistant, and so forth. Generally, different communication channels (e.g., communication channels 140) may have different capacities, customer demands, volumes of traffic, and so forth. Accordingly, different communication channels may have different wait times before a customer may be able to interact with a customer service agent. For example, a customer may wait for 1-2 hours before being connected with a customer service agent via the telephone. However, the customer may wait for 20 minutes before being connected with a customer service agent via the web interface. However, customers may be unaware of this difference in wait times for different communication channels.

As another example, a customer using a customer device (e.g., customer devices 150) may be transferred to different service agents who may be better equipped to address the customer query. For example, the customer may be calling from Illinois and may have a query related to a mortgage loan. A first service agent may determine that a mortgage loan specialist who is a licensed professional in Illinois may need to respond to the customer query. Accordingly, the customer may be transferred to the licensed professional. This may lead to further wait times. Also, for example, the customer may need to repeat details of the query to the licensed professional, thereby increasing a time to resolution of the issue, and causing the customer to repeat details. Accordingly, query redistribution computing platform 110 may monitor such user traffic over the various customer service communication channels.

At step 202, query redistribution computing platform 110 may identify, for the one or more customer service communication channels and based on the user traffic, estimated wait times for a plurality of users to be served via the one or more customer service communication channels. For example, the one or more customer service communication channels (e.g., communication channels 140) may determine average wait times for a user using a customer device (e.g., customer devices 150) based on a volume of traffic, types of queries, a time of day, a geographic region, and so forth. Generally, query redistribution computing platform 110 may determine average time per call/session, and extrapolate the time to a number of users using a customer device (e.g., customer devices 150) waiting in a queue to determine a wait time. For example, for a telephone call, query redistribution computing platform 110 may determine that each customer call may be of a duration of 15 minutes, and there may be 5 users in the queue. Accordingly, for the sixth user, query redistribution computing platform 110 may determine the wait time to be 75 minutes. In some embodiments, one or more probability distributions may be utilized to estimate wait times for the one or more customer communication channels.

In some embodiments, query redistribution computing platform 110 may determine wait times based on historical data on user traffic. For example, query redistribution computing platform 110 may retrieve historical data from an enterprise data storage platform (e.g., enterprise data storage platform 130), and analyze such historical data to determine that at a given time during the day, there are more customers calling via telephone, than those communicating via a web interface. For example, query redistribution computing platform 110 may determine that a large number of calls from the west coast are received by service agents on the east coast during a lunch hour on the east coast. Also, for example, query redistribution computing platform 110 may determine that when the Federal Reserve announces a reduction in interest rates, a volume of mortgage loan related queries may increase significantly. As another example, query redistribution computing platform 110 may determine that after a severe weather related event, a volume of customer queries at a utility service provider may increase significantly. Additional and/or alternate types of user traffic may be analyzed to determine wait times.

At step 203, query redistribution computing platform 110 may initiate, via an intelligent virtual assistant, a communication with a given user of the plurality of users. For example, as a user using a customer device (e.g., customer devices 150) may wait in a queue, the intelligent virtual assistant may be deployed to gather information from the user that may enable query redistribution computing platform 110 to address the query in an efficient manner. In some embodiments, the intelligent virtual assistant may be deployed as a user using a customer device (e.g., customer devices 150) gets closer to being served (e.g., is a next person in line) via the communication channel. Generally, in instances where a user using a customer device (e.g., customer devices 150) may be transferred from one service agent to another, the customer may have to repeat details of their query. However, this may cause unnecessary delays, and in some instances, the users may be misdirected to a customer service agent. Accordingly, it may be of high significance for an enterprise organization to determine various attributes of the customer query, analyze such attributes, determine available resources that may effectively resolve issues indicated by the attributes, direct the customer to an appropriate communication channel and/or service agent, and provide the service agent with the attributes of the query, so that the customer queries may be addressed in a fast, efficient, and reliable manner. Accordingly, intelligent virtual assistant may be deployed to perform one or more such activities.

At step 204, query redistribution computing platform 110 may receive, via the intelligent virtual assistant and based on the communication with the given user, one or more attributes of a query of the given user. For example, the virtual assistant may communicate with a user using a customer device (e.g., customer devices 150) to determine aspects of the query. For example, the one or more attributes may be indicative of why the customer is calling the service center. For example, the intelligent virtual assistant may determine if the customer needs assistance with a mortgage, a checking account balance, a bill pay, and so forth.

In some embodiments, the one or more attributes may be indicative of a preferred communication channel of the customer. For example, a may prefer to communicate via a telephone. Also, for example, a customer may prefer to communicate via a web interface. Accordingly, query redistribution computing platform 110 may cause the intelligent virtual assistant to determine customer preferences for the one or more communication channels.

In some embodiments, the computing platform may determine whether a licensed professional is needed to address the query. For example, the query may relate to a mortgage inquiry, a legal inquiry, and so forth, and a licensed professional may be needed to address the query. Additional and/or alternative training, qualifications, expertise, and so forth may be needed to address the query. For example, a query may relate to a data privacy issue, and a certified data privacy professional may be needed to address the query.

Referring to FIG. 2B, at step 205, query redistribution computing platform 110 may select, via the computing device and based on the estimated wait times and the one or more attributes of the query of the given user, a customer service communication channel of the one or more customer service communication channels. For example, the wait time for a chat interface may be less than a wait time for a telephone communication. Accordingly, query redistribution computing platform 110 may select the chat interface as the customer service communication channel. Also, for example, upon a determination that a licensed professional may be needed to address the query, query redistribution computing platform 110 may select the customer service communication channel associated with the licensed professional. In some embodiments, query redistribution computing platform 110 may analyze a combination of factors, such as, for example, wait times for the one or more customer service communication channels, and the one or more attributes of the query.

In some embodiments, the virtual assistant may be capable of addressing the customer query. For example, a customer may enquire about an account balance, and the virtual assistant may be configured to access a repository (e.g., enterprise data storage platform 130) to retrieve the relevant information and provide the information to the customer.

In some embodiments, query redistribution computing platform 110 may identify, based on the one or more attributes of the query of the given user and the estimated wait times, a geographic region. For example, different lines of business, different regions, and so forth, may have different overall user traffic. For example, the northeastern region of the United States may have less mortgage traffic than the southern region of the United States. Accordingly, mortgage related customer calls may be directed from the southern region to the northeastern region.

As described herein, the northeastern region of the United States may have less mortgage related queries than the southern region of the United States. Accordingly, for mortgage related queries, query redistribution computing platform 110 may identify the southern region. Then, the computing platform may select the customer service communication channel associated with the geographic region. For example, query redistribution computing platform 110 may identify the wait times for communication channels operated by agents in the southern region, and may select the customer service communication channel associated with the southern region.

Generally, the virtual assistant may collect information related to customer issues, and query redistribution computing platform 110 may optimize available resources based on available resources, special considerations (e.g., certifications, licenses, and so forth), geographic region (e.g., certain communication channels may be available in certain regions), and/or customer preferences.

In some embodiments, query redistribution computing platform 110 may train a machine learning model to select the customer service communication channel. For example, the machine learning model may be trained based on historical data of channel utilization, demand, and so forth. Also, for example, the machine learning model may be trained to detect patterns of types of transactions that may be handled by different customer service communication channels, queries that may need a licensed professional, and so forth, and correlate types of channels with customer groups (region, type of query, gender, age group, and so forth). Various unsupervised learning models may be utilized to detect such patterns. For example, a K-means clustering model, a medoid clustering model, and so forth may be utilized to train the machine learning model. Subsequently, the computing platform may apply the trained machine learning model to select the customer service communication channel.

In some embodiments, query redistribution computing platform 110 may train a machine learning model to route the customer queries. For example, query redistribution computing platform 110 may train the machine learning model to predict a volume of customer traffic. For example, during an emergency, the machine learning model may predict a higher volume of queries related to banking. As another example, when interest rates decline, the machine learning model may predict a higher volume of queries related to refinancing options, mortgage options for a new home purchase, and so forth. Accordingly, the machine learning model may predict resources that may be needed to meet an increased or decreased customer demand. For example, query redistribution computing platform 110 may allocate call center resources based on predictions made by the machine learning model. In some embodiments, the machine learning model may be configured to utilize an appropriate constrained optimization algorithm to optimize available resources.

In some embodiments, the machine learning model may be based on reinforced learning. For example, query redistribution computing platform 110 may determine types of resource allocations and their impact on a flow of customer traffic. For example, certain configurations of redistributing queries may result in reduced wait times, optimized available resources, and/or increased customer satisfaction. Accordingly, query redistribution computing platform 110 may positively reinforce such configurations. As another example, certain service centers may be more effective in resolving certain issues, and query redistribution computing platform 110 may positively reinforce redirection to such service centers for such issues. Also, for example, certain queries may be historically directed to a manager for resolution. Accordingly, query redistribution computing platform 110 may identify such queries, positively reinforce redirection of such queries directly to an appropriate manager.

In some embodiments, intelligent virtual assistant may integrate with one or more external artificial intelligence (AI) systems to provide recommendations to a user. Such AI systems may include, for example, a weather system, a news analysis system, a stock market analysis system, a virtual assistant associated with mobile devices, a consumer behavior analysis system, an email analysis system, and so forth.

Generally, the intelligent virtual assistant may utilize the AI system to receive the one or more attributes of the customer query. In some embodiments, the AI system may proactively message the customer to provide updates about anticipated wait times, account activity, account balance, and so forth. As described herein, such messages may be sent via a natural language processing system. For example, such messages may be sent via an SMS service, and may assume that the customer has a minimum level of internet connectivity. In some embodiments, the virtual assistant may interact with the customer via a telephone, a personal computer, a mobile device, a video link, and so forth. Also, for example, the virtual assistant may be configured to interact with the customer via a variety of channels, operating systems, natural languages, and so forth.

In some embodiments, query redistribution computing platform 110 may determine that the given user has access to a higher generation wireless communication interface (e.g., a fifth generation cellular network). Accordingly, query redistribution computing platform 110 may determine that the user has a higher bandwidth, and may be able to communicate via a video teleconferencing interface. Then, query redistribution computing platform 110 may recommend, to the given user and to address the query, a video teleconference interface based on the higher generation wireless communication interface.

In some embodiments, query redistribution computing platform 110 may determine, based on location data from a higher generation wireless communication interface, a physical location of the given user. For example, a fifth generation cellular network may be able to provide more accurate location data for the given user. Then, query redistribution computing platform 110 may recommend, to the given user and based on the physical location, a physical facility to address the query. In some embodiments, query redistribution computing platform 110 may cause the virtual assistant to send the one or more attributes of the query to a qualified personnel at the physical location. In some embodiments, query redistribution computing platform 110 may evaluate wait time at the physical facility, schedule an appointment, forward the one or more attributes of the query collected by the virtual assistant, and so forth.

At step 206, query redistribution computing platform 110 may provide, via the intelligent virtual assistant and to an enterprise agent associated with the selected customer service communication channel, the one or more attributes of the query of the given user. For example, the collected information may be sent to a qualified personnel at a physical location. Also, for example, the virtual assistant may read out the query to a trained and licensed professional, who may be capable of handling the case. As described herein, a customer may generally be transferred from one service agent to another, and may have to repeat details of the query to each service agent. However, the virtual assistant may communicate with the customer to determine the one or more attributes, and provide the one or more attributes to the appropriate service agent at a selected customer service communication channel (e.g., communication channels 140). Accordingly, the customer may not have to repeat their queries, and the customer service agent may also be able to efficiently and/r accurately retrieve information relevant to a resolution of the customer query.

At step 207, query redistribution computing platform 110 may direct the given user to the selected customer service communication channel. For example, the given user using a customer device (e.g., customer devices 150) may have made a telephone call to the service center, and query redistribution computing platform 110 may select the text messaging medium as the customer service communication channel (e.g., based on relative wait times for call and messaging, user preferences, geographic region, availability of a license professional, and so forth). Accordingly, query redistribution computing platform 110 may recommend that the given user using a customer device (e.g., customer devices 150) be transferred from the telephone call to the text messaging medium. Upon receiving confirmation from the given user, query redistribution computing platform 110 may direct the given user using a customer device (e.g., customer devices 150) to the text messaging medium.

As described herein, in some embodiments, query redistribution computing platform 110 may address the query via the intelligent virtual assistant. For example, the query may relate to an inquiry about a daily refinance rate, and the intelligent virtual assistant may retrieve and provide that information without having to redirect the user to a customer service agent. As another example, the query may relate to an inquiry about an account balance, and the intelligent virtual assistant may retrieve and provide that information without having to redirect the user to a customer service agent. Also, for example, the query may relate to an inquiry about refund for a past purchase, and the intelligent virtual assistant may automatically process the refund without having to redirect the user to a customer service agent.

In some embodiments, query redistribution computing platform 110 may retrieve, from one or more external sources of data, one or more events that may impact the volume of user traffic, and/or wait times. As described herein, the user may be located in a geographical area that may have experienced a weather related event (e.g., snowstorm, hurricane, tornado, volcanic eruption, floods, forest fires, and so forth), a public health care related event, a civic unrest, a political upheaval, and so forth. Generally, such events may disrupt a customer's ability to access their account, and/or make purchase activities, and may therefore lead to an increase in a number of customer queries. In some embodiments, the one or more external sources of data may be artificial intelligence based systems. In some embodiments, the event may include one or more of a weather related event, a geopolitical event, a civic unrest, and a medical event. Look at external data sources and identify covid, interest rate, weather etc, determine anticipated customer traffic based on this for banking activity, trading activity, mortgage activity, and so forth, and adjust resource allocation accordingly.

In some embodiments, query redistribution computing platform 110 may identify, from one or more external data sources, an event that may impact the estimated wait times. For example, news may indicate a decline in stock prices. Then, query redistribution computing platform 110 may determine, based on the identified event, an allocation of resources for the one or more customer service communication channels. For example, based on a decline in the stock prices, query redistribution computing platform 110 may predict an increased activity in the trading center, leading to increased wait times. Accordingly, query redistribution computing platform 110 may allocate additional resources to the trading center.

In some embodiments, query redistribution computing platform 110 may train the machine learning model to determine the allocation of resources for the one or more customer service communication channels. For example, the machine learning model may be trained on historical data indicative of patterns of customer queries, types of queries, the one or more attributes, paths to resolution of the queries, and so forth. Based on such analysis of the historical data, query redistribution computing platform 110 may train the machine learning model to correlate past events with volumes of traffic, types of queries, the one or more attributes, and so forth, and based on the correlations, may allocate resources, and/or recommend allocation of resources.

In some embodiments, the machine learning model may be trained to detect patterns of customer activity based on a time zone. For example, availability of customer service agents may vary with a geographical region, a time zone, and so forth. For example, lunch time on the east coast of the United States may generally correspond to morning working hours on the west coast. In some instances, during a lunch hour, customer service agents on the east coast may receive a large number of calls from customers on the west coast.

Accordingly, the machine learning model may redistribute customer queries from agents on the east coast to agents on the west coast during that time. Also, for example, the machine learning model may recommend that additional customer service agents may be employed on the west coast to reduce a volume of customer queries and/or longer wait times during lunch hours on the east coast.

Figure 3:
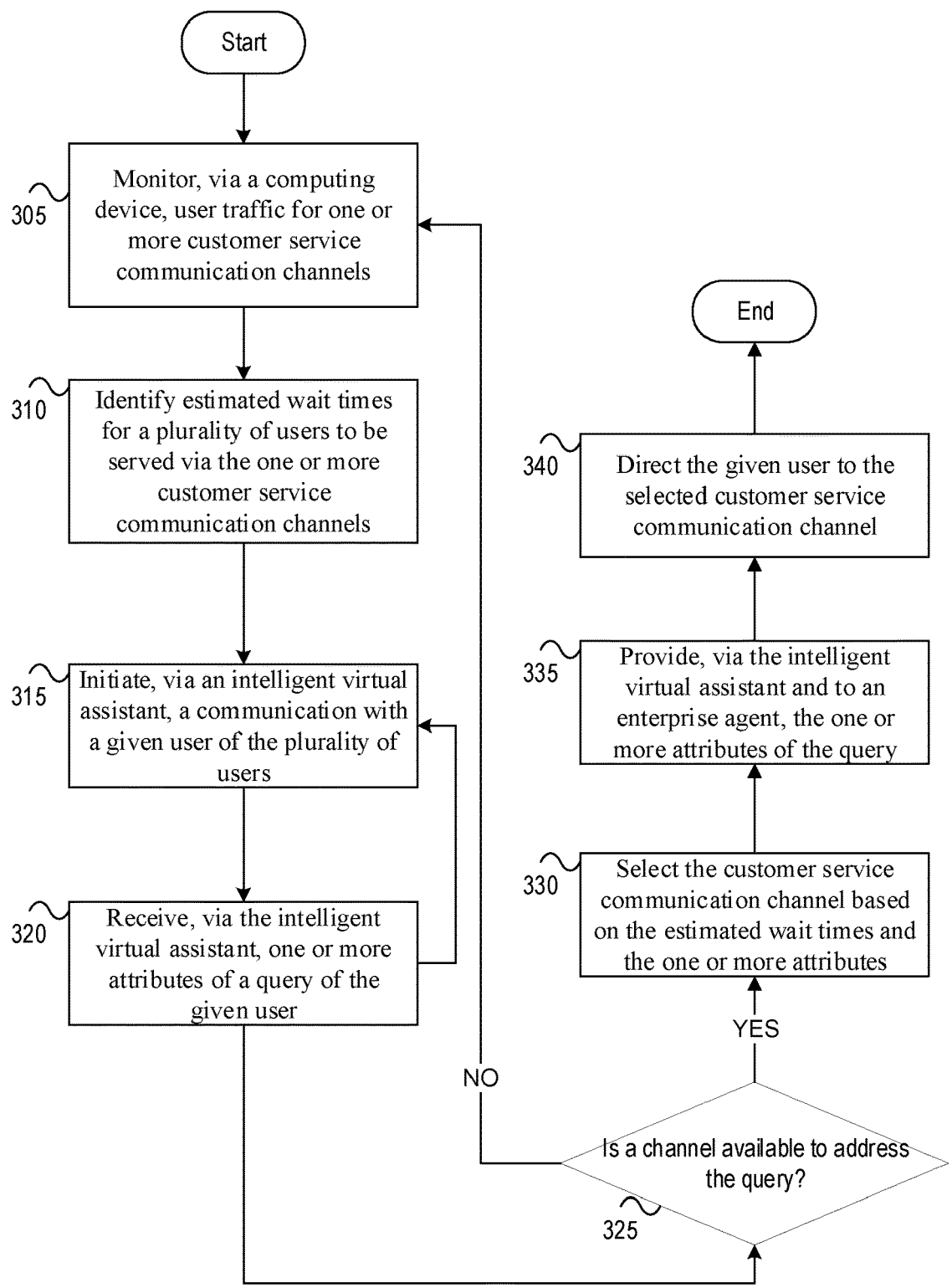
FIG. 3 depicts an illustrative method for machine learning based automated redistribution of queries to underutilized channels.

FIG. 3 depicts an illustrative method for automated redistribution of queries to underutilized channels. Referring to FIG. 3, at step 305, query redistribution computing platform 110 having at least one processor, and memory may monitor, via a computing device, user traffic for one or more customer service communication channels. At step 310, query redistribution computing platform 110 may identify, for the one or more customer service communication channels and based on the user traffic, estimated wait times for a plurality of users to be served via the one or more customer service communication channels. At step 315, query redistribution computing platform 110 may initiate, via an intelligent virtual assistant, a communication with a given user of the plurality of users. At step 320, query redistribution computing platform 110 may receive, via the intelligent virtual assistant and based on the communication with the given user, one or more attributes of a query of the given user. In some embodiments, query redistribution computing platform 110 may perform steps 315 and 320 iteratively to determine the one or more attributes of the query.

At step 325, query redistribution computing platform 110 may determine whether a customer service communication channel may be available to address the query. Upon a determination that a customer service communication channel may not be available to address the query, the process may return to step 305. Upon a determination that a customer service communication channel may be available to address the query, the process may proceed to step 330. At step 330, query redistribution computing platform 110 may select, via the computing device and based on the estimated wait times and the one or more attributes of the query of the given user, a customer service communication channel of the one or more customer service communication channels. At step 335, query redistribution computing platform 110 may provide, via the intelligent virtual assistant and to an enterprise agent associated with the selected customer service communication channel, the one or more attributes of the query of the given user. At step 340, query redistribution computing platform 110 may direct the given user to the selected customer service communication channel.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular time-sensitive tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor; and
   memory storing computer-readable instructions that, when executed by the at least one processor, cause the computing platform to:
   monitor, via a computing device, user traffic for one or more customer service communication channels;
   identify, for the one or more customer service communication channels and based on the user traffic, estimated waft times for a plurality of users to be served via the one or more customer service communication channels;
   initiate, via an intelligent virtual assistant, a communication with a given user of the plurality of users via a first customer service communication channel of the one or more customer service communication channels;

receive, via the intelligent virtual assistant and based on the communication with the given user via the first customer service communication channel, one or more attributes of a query of the given user;

train a machine learning model to detect patterns of estimated wait times and attributes of queries;

identify, from one or more external data sources, an event that may impact the estimated wait times;

train the machine learning model to determine an allocation of resources for the one or more customer service communication channels;

determine, based on the identified event and by applying the machine learning model, the allocation of resources for the one or more customer service communication channels;

select, via the computing device by applying the machine learning model and based on the estimated wait times, the one or more attributes of the query of the given user and the allocation of resource for the one or more customer service communication channels, a second customer service communication channel of the one or more customer service communication channels different from the first customer service communication channel;

provide, via the intelligent virtual assistant and to an enterprise agent associated with the second customer service communication channel, the one or more attributes of the query of the given user received based on the communication with the given user via the first customer service communication channel; and direct the given user to the second customer service communication channel.

2. The computing platform of claim 1, wherein the one or more customer service communication channels comprise one of: a telephone communication channel, a web interface, a video teleconference interface, an electronic mail communication channel, and the intelligent virtual assistant.

3. The computing platform of claim 1, wherein the instructions to direct the given user to the second customer service communication channel comprise additional computer-readable instructions that, when executed by the at least one processor, cause the computing platform to:

address the query via the intelligent virtual assistant.

4. The computing platform of claim 1, wherein the instructions to select the second customer service communication channel comprise additional computer-readable instructions that, when executed by the at least one processor, cause the computing platform to:

determine whether a licensed professional is needed to address the query; and upon a determination that a licensed professional is needed to address the query, select the second customer service communication channel associated with the licensed professional.

5. The computing platform of claim 1, wherein the instructions to select the second customer service communication channel comprise additional computer-readable instructions that, when executed by the at least one processor, cause the computing platform to:

identify, based on the one or more attributes of the query of the given user and the estimated wait times, a geographic region; and select the second customer service communication channel based on the identified geographic region.

6. The computing platform of claim 1, wherein the instructions comprise additional computer-readable instructions that, when executed by the at least one processor, cause the computing platform to: train the machine learning model to select the second customer service communication channel.

7. The computing platform of claim 6, wherein the instructions comprise additional computer-readable instructions that, when executed by the at least one processor, cause the computing platform to:

apply the trained machine learning model to select the second customer service communication channel.

8. The computing platform of claim 1, wherein the instructions comprise additional computer-readable instructions that, when executed by the at least one processor, cause the computing platform to:

determine that the given user has access to a higher generation wireless communication interface; and recommend, to the given user and to address the query, a video teleconference interface based on the higher generation wireless communication interface.

9. The computing platform of claim 1, wherein the instructions comprise additional computer-readable instructions that, when executed by the at least one processor, cause the computing platform to:

determine, based on location data from a higher generation wireless communication interface, a physical location of the given user; and recommend, to the given user and based on the physical location, a physical facility to address the query.

10. A method, comprising:

at a computing platform comprising at least one processor, and memory:

identifying, via a computing device and for one or more customer service communication channels, estimated wait times for a plurality of users to be served via the one or more customer service communication channels;

initiating, via an intelligent virtual assistant, a communication with a given user of the plurality of users via a first customer service communication channel of the one or more customer service communication channels;

receiving, via the intelligent virtual assistant and based on the communication with the given user via the first customer service communication channel, one or more attributes of a query of the given user;

training a machine learning model to detect patterns of estimated wait times and attributes of queries;

identifying, from one or more external data sources, an event that may impact the estimated wait times;

training the machine learning model to determine an allocation of resources for the one or more customer service communication channels;

determining, based on the identified event and by applying the machine learning model, the allocation of resources for the one or more customer service communication channels;

selecting, by applying the machine learning model and based on the one or more attributes of the query of the given user and the allocation of resources, a second customer service communication channel of the one or more customer service communication channels different from the first customer service communication channel;

providing, via the intelligent virtual assistant and to an enterprise agent associated with the second customer service communication channel, the one or more attributes of the query of the given user received based on the communication with the given user via the first customer service communication channel; and directing the given user to the second customer service communication channel.

11. The method of claim 10, wherein the one or more customer service communication channels comprise one of: a telephone communication channel, a web interface, a video teleconference interface, an electronic mail communication channel, and the intelligent virtual assistant.

12. The method of claim 10, further comprising:
addressing the query via the intelligent virtual assistant.

13. The method of claim 10, further comprising:
determining whether a licensed professional is needed to address the query; and
upon a determination that a licensed professional is needed to address the query, selecting the second customer service communication channel associated with the licensed professional.

14. The method of claim 10, further comprising:
identifying, based on the one or more attributes of the query of the given user and the estimated wait times, a geographic region; and
selecting the second customer service communication channel based on the identified geographic region.

15. The method of claim 10, further comprising:
determining that the given user has access to a higher generation wireless communication interface; and
recommending, to the given user and to address the query, a video teleconference interface based on the higher generation wireless communication interface.

16. One or more non-transitory computer-readable media storing instructions that, when executed by a computing platform comprising at least one processor, at least one physical sensor communicatively coupled to the at least one processor, and memory, cause the computing platform to:

identify, for one or more customer service communication channels, estimated wait times for a plurality of users to be served via the one or more customer service communication channels;

initiate, via an intelligent virtual assistant, a communication with a given user of the plurality of users via a first customer service communication channel of the one or more customer service communication channels;

receive, via the intelligent virtual assistant and based on the communication with the given user via the first customer service communication channel, one or more attributes of a query of the given user;

train a machine learning model to detect patterns of estimated wait times and attributes of queries;

identify, from one or more external data sources, an event that may impact the estimated wait times;

train the machine learning model to determine an allocation of resources for the one or more customer service communication channels;

determine, based on the identified event and by applying the machine learning model, the allocation of resources for the one or more customer service communication channels;

select, via the computing platform by applying the machine learning model and based on the estimated wait times, the one or more attributes of the query of the given user and the allocation of resources, a second customer service communication channel of the one or more customer service communication channels different from the first customer service communication channel;

provide, via the intelligent virtual assistant and to an enterprise agent associated with the second customer service communication channel, the one or more attributes of the query of the given user; and direct the given user to the second customer service communication channel.

\* \* \* \* \*

UNITED STATES PATENT AND TRADEMARK OFFICE
CERTIFICATE OF CORRECTION

PATENT NO. : 11,190,643 B1
APPLICATION NO. : 16/942954
DATED : November 30, 2021
INVENTOR(S) : Sanghvi et al.

Page 1 of 1

It is certified that error appears in the above-identified patent and that said Letters Patent is hereby corrected as shown below:

In the Claims

Column 14, Line 63:
In Claim 1, delete "waft" and insert --wait--

Column 16, Line 6:
In Claim 6, after "to:", insert --¶--

Signed and Sealed this
Twenty-second Day of February, 2022

Drew Hirshfeld
*Performing the Functions and Duties of the*
*Under Secretary of Commerce for Intellectual Property and*
*Director of the United States Patent and Trademark Office*